United States Patent
Campbell et al.

(10) Patent No.: US 9,450,872 B2
(45) Date of Patent: Sep. 20, 2016

(54) METHODS, SYSTEMS AND COMPUTER READABLE MEDIA FOR COLLECTING AND DISTRIBUTING DIAMETER OVERLOAD CONTROL INFORMATION TO NON-ADJACENT NODES

(71) Applicant: Oracle International Corporation, Redwood Shores, CA (US)

(72) Inventors: Ben Allen Campbell, Irving, TX (US); Sam Eric McMurry, Richardson, TX (US); Robert James Sparks, Plano, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 105 days.

(21) Appl. No.: 14/313,610

(22) Filed: Jun. 24, 2014

(65) Prior Publication Data

US 2014/0376380 A1  Dec. 25, 2014

Related U.S. Application Data

(60) Provisional application No. 61/838,858, filed on Jun. 24, 2013.

(51) Int. Cl.
*H04L 1/00* (2006.01)
*H04L 12/801* (2013.01)

(52) U.S. Cl.
CPC .................................. *H04L 47/10* (2013.01)

(58) Field of Classification Search
CPC ...................................................... H04L 47/10
USPC ................................................. 370/229–240
See application file for complete search history.

(56) References Cited

U.S. PATENT DOCUMENTS 7,522,517 B1   4/2009   Johnson
8,468,267 B2   6/2013   Yigang et al.

(Continued)

FOREIGN PATENT DOCUMENTS

KR   10-2009-0029348        3/2009
WO   WO 2009/070179 A1   6/2009

(Continued)

OTHER PUBLICATIONS

Notification of Transmittal of the International Search Report and the Written Opinion of the International Searching Authority, or the Declaration for International Application No. PCT/US2014/066240 (May 13, 2015).

(Continued)

*Primary Examiner* — Ricky Ngo
*Assistant Examiner* — Wei-Po Kao
(74) *Attorney, Agent, or Firm* — Jeknins, Wilson, Taylor & Hunt, P.A.

(57) ABSTRACT

Methods, systems, and computer readable media for collecting and distributing Diameter overload control information to non-adjacent nodes are disclosed. One system for implementing the subject matter described herein includes a Diameter overload control information broker. The Diameter overload control information broker includes a Diameter overload control information collector for receiving Diameter overload control information from at least one Diameter node separate from the Diameter overload control information broker. The broker includes a memory for storing the overload control information. The broker further includes a Diameter overload control information distributor for distributing the Diameter overload control information to at least one Diameter node that is not adjacent to the at least one Diameter node from which the overload control information was received.

18 Claims, 6 Drawing Sheets

(56) References Cited

U.S. PATENT DOCUMENTS

| | | | |
|---|---|---|---|
| 8,601,073 | B2 | 12/2013 | Craig et al. |
| 8,879,431 | B2 | 11/2014 | Ridel et al. |
| 9,106,769 | B2 | 8/2015 | Kanode et al. |
| 9,240,949 | B2 | 1/2016 | McMurry et al. |
| 2003/0200277 | A1 | 10/2003 | Kim |
| 2007/0153995 | A1 | 7/2007 | Fang et al. |
| 2008/0250156 | A1 | 10/2008 | Agarwal et al. |
| 2009/0185494 | A1 | 7/2009 | Li et al. |
| 2009/0232011 | A1 | 9/2009 | Li et al. |
| 2009/0265467 | A1 | 10/2009 | Peles |
| 2010/0030914 | A1 | 2/2010 | Sparks et al. |
| 2010/0211956 | A1 | 8/2010 | Gopisetty et al. |
| 2010/0299451 | A1 | 11/2010 | Yigang et al. |
| 2011/0040845 | A1* | 2/2011 | Cai .................. H04L 47/10 709/206 |
| 2011/0061061 | A1 | 3/2011 | Chen et al. |
| 2011/0090900 | A1 | 4/2011 | Jackson et al. |
| 2011/0116382 | A1 | 5/2011 | McCann et al. |
| 2011/0171958 | A1 | 7/2011 | Hua et al. |
| 2011/0200053 | A1 | 8/2011 | Kanode et al. |
| 2011/0202676 | A1 | 8/2011 | Craig et al. |
| 2011/0299395 | A1 | 12/2011 | Mariblanca Nieves |
| 2012/0044867 | A1 | 2/2012 | Faccin et al. |
| 2012/0087368 | A1 | 4/2012 | Kunarathnam et al. |
| 2012/0131165 | A1 | 5/2012 | Baniel et al. |
| 2012/0155389 | A1 | 6/2012 | McNamee et al. |
| 2012/0203781 | A1 | 8/2012 | Wakefield |
| 2012/0221445 | A1 | 8/2012 | Sharma |
| 2012/0221693 | A1 | 8/2012 | Cutler et al. |
| 2012/0303796 | A1 | 11/2012 | Mo et al. |
| 2012/0307631 | A1 | 12/2012 | Yang et al. |
| 2013/0039176 | A1 | 2/2013 | Kanode et al. |
| 2013/0124712 | A1 | 5/2013 | Parker |
| 2013/0163429 | A1 | 6/2013 | Dunstan et al. |
| 2013/0188489 | A1 | 7/2013 | Sato |
| 2013/0223219 | A1 | 8/2013 | Mir et al. |
| 2013/0250770 | A1 | 9/2013 | Zou et al. |
| 2013/0275583 | A1* | 10/2013 | Roach ................ H04L 43/08 709/224 |
| 2014/0192646 | A1 | 7/2014 | Mir et al. |
| 2014/0310388 | A1 | 10/2014 | Djukic et al. |
| 2015/0036486 | A1 | 2/2015 | McMurry et al. |
| 2015/0036504 | A1 | 2/2015 | McMurry et al. |
| 2015/0036505 | A1 | 2/2015 | Sparks et al. |
| 2015/0085663 | A1 | 3/2015 | McMurry et al. |
| 2015/0149656 | A1 | 5/2015 | McMurry et al. |

FOREIGN PATENT DOCUMENTS

| | | |
|---|---|---|
| WO | WO 2011/161575 A1 | 12/2011 |
| WO | WO 2012/119147 A1 | 9/2012 |
| WO | WO 2012/130264 A1 | 10/2012 |
| WO | WO 2013/155535 A1 | 10/2013 |
| WO | WO 2015/017422 A1 | 2/2015 |
| WO | WO 2015/041750 A1 | 3/2015 |
| WO | WO 2015/080906 A1 | 6/2015 |

OTHER PUBLICATIONS

Non-Final Office Action for U.S. Appl. No. 13/956,304 (May 4, 2015).

Non-Final Office Action for U.S. Appl. No. 13/956,307 (Apr. 23, 2015).

Notice of Allowance and Fee(s) Due and Examiner-Initiated Interview Summary for U.S. Appl. No. 13/572,156 (Apr. 6, 2015).

Non-Final Office Action for U.S. Appl. No. 13/956,300 (Apr. 8, 2015).

Non-Final Office Action for U.S. Appl. No. 13/863,351 (Mar. 27, 2015).

Non-Final Office Action for U.S. Appl. No. 14/034,478 (Mar. 23, 2015).

Final Office Action for U.S. Appl. No. 13/572,156 (Dec. 29, 2014).

Non-Final Office Action for U.S. Appl. No. 13/572,156 (May 23, 2014).

"Split Architecture for Large Scale Wide Area Networks," SPARC ICT-258457 Deliverable D3.3, pp. 1-129 (Dec. 1, 2011).

3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).

Communication of European publication number and information on the application of Article 67(3) EPC for European Application No. 13776083.1 (Jan. 21, 2015).

Commonly-assigned, co-pending International Application No. PCT/US14/66240 for "Methods, Systems, and Computer Readable Media for Diameter Routing Using Software Defined Network (SDN) Functionality," (Unpublished, filed Nov. 18, 2014).

Notification of Transmittal of the International Search Report and the Written Opinion for of the International Searching Authority, or the Declaration for International Application No. PCT/US2014/048651 (Nov. 17, 2014).

Notification of Transmittal of the International Search Report and the Written Opinion of the International Searching Authority, or the Declaration for International Application No. PCT/US2014/048644 (Oct. 17, 2014).

Commonly-assigned, co-pending International Application No. PCT/US14/48651 for "Methods, Systems, and Computer Readable Media for Diameter Load and Overload Information and Virtualization," (Unpublished, filed Jul. 29, 2014).

Commonly-assigned, co-pending International Application No. PCT/US14/48644 for "Methods, Systems, and Computer Readable Media for Mitigating Traffic Storms," (Unpublished, filed Jul. 29, 2014).

Commonly-assigned, co-pending U.S. Appl. No. 14/034,478 for "Methods, Systems, and Computer Readable Media for Diameter Load and Overload Information and Virtualization," (Unpublished, filed Sep. 23, 2013).

Tschofenig, "Diameter Overload Architecture and Information Model," draft-tschofenig-dime-overload-arch-00.txt, DIME, pp. 1-9 (Jul. 16, 2013).

Notification of Transmittal of the International Search Report and the Written Opinion of the International Searching Authority, or the Declaration for International Application No. PCT/US2013/036664 (Jul. 2, 2013).

Campbell, "Diameter Overload Control Solution Issues," draft-campbell-dime-overload-issues-00, pp. 1-16 (Jun. 2013).

"3rd Generation Partnership Project; Technical Specification Group Core Network and Terminals; Study on Diameter overload control mechanisms (Release 12)," 3GPP TR 29.809 V0.3.0, pp. 1-51 (Jun. 2013).

Roach et al., "A Mechanism for Diameter Overload Control," draft-roach-dime-overload-ctrl-03, DIME, pp. 1-49 (May 17, 2013).

Korhonen et al., "The Diameter Overload Control Application (DOCA)," draft-korhonen-dime-ovl-01.txt, Diameter Maintenance and Extensions (DIME), pp. 1-18 (Feb. 25, 2013).

Fajardo et al., "Diameter Base Protocol," RFC 6733, pp. 1-152 (Oct. 2012).

McMurry et al., "Diameter Overload Control Requirements,", draft-ietf-dime-overload-reqs-00, pp. 1-25 (Sep. 21, 2012).

"OpenFlow Switch Specification," https://www.opennetworking.org/images/stories/downloads/sdn-resources/onf-specifications/openflow/openflow-spec-v1.2.pdf, Version 1.2 (Wire Protocol 0x03), Open Networking Foundation, pp. 1-85 (Dec. 5, 2011).

Calhoun et al., "Diameter Base Protocol," RFC 3588, pp. 1-147 (Sep. 2003).

Non-Final Office Action for U.S. Appl. No. 14/034,478 (Apr. 5, 2016).

Non-Final Office Action for U.S. Appl. No. 13/863,351 (Mar. 17, 2016).

Notice of Allowance and Fee(s) Due for U.S. Appl. No. 13/956,304 (Mar. 16, 2016).

Notice of Allowance and Fee(s) Due and Examiner-Initiated Interview Summary for U.S. Appl. No. 13/956,307 (Feb. 12, 2016).

Applicant-Initiated Interview Summary for U.S. Appl. No. 13/956,304 (Feb. 1, 2016).

(56) References Cited

OTHER PUBLICATIONS

Applicant-Initiated Interview Summary for U.S. Appl. No. 14/092,898 (Jan. 14, 2016).
Extended European Search Report for European Application No. 13776083.1 (Dec. 14, 2015).
Supplemental Notice of Allowability for U.S. Appl. No. 13/956,300 (Dec. 1, 2015).
Advisory Action for U.S. Appl. No. 13/863,351 (Nov. 25, 2015).
Advisory Action for U.S. Appl. No. 14/034,478 (Nov. 17, 2015).
Final Office Action for U.S. Appl. No. 13/956,307 (Nov. 5, 2015).
Final Office Action for U.S. Appl. No. 13/956,304 (Nov. 3, 2015).
Notice of Allowance and Fee(s) Due & Examiner-Initiated Interview Summary for U.S. Appl. No. 13/956,300 (Oct. 23, 2015).
Non-Final Office Action for U.S. Appl. No. 14/092,898 (Oct. 8, 2015).
Final Office Action for U.S. Appl. No. 13/863,351 (Sep. 11, 2015).
Final Office Action for U.S. Appl. No. 14/034,478 (Sep. 8, 2015).
Applicant-Initiated Interview Summary for U.S. Appl. No. 13/956,304 (Aug. 5, 2015).
Applicant-Initiated Interview Summary for U.S. Appl. No. 13/956,300 (Jun. 29, 2015).
Commonly-assigned, co-pending U.S. Appl. No. 14/720,412 for "Methods, Systems, and Computer Readable Media for Short and Long Term Policy and Charging Rules Function (PCRF) Load Balancing," (Unpublished, filed May 22, 2015).
"Multi-Protocol Routing Agent User Guide," Policy Management, 910-6648-001 Revision A, pp. 1-70 (Mar. 2013).
"Multi-Protocol Routing Agent User Guide," Policy Management, 910-6404-001 Revision A, pp. 1-70 (Jun. 2012).

\* cited by examiner

METHODS, SYSTEMS AND COMPUTER READABLE MEDIA FOR COLLECTING AND DISTRIBUTING DIAMETER OVERLOAD CONTROL INFORMATION TO NON-ADJACENT NODES

PRIORITY CLAIM

This application claims the benefit of U.S. Provisional Patent Application Ser. No. 61/838,858, filed Jun. 24, 2013, the disclosure of which is incorporated herein by reference in its entirety.

TECHNICAL FIELD

The subject matter described herein relates to Diameter overload control. More particularly, the subject matter described herein relates to methods, systems, and computer readable media for collecting and distributing Diameter overload control information to non-adjacent nodes.

BACKGROUND

Diameter overload control is a mechanism by which a Diameter node indicates to other Diameter nodes that the reporting Diameter node is in an overload condition. The recipient of the Diameter overload control information, provided that the recipient supports Diameter overload control, should take some action, such as rerouting traffic around the overloaded node or slowing the flow of Diameter messages to the overloaded node until the overload condition is abated.

Currently there are a number of overload control information mechanisms proposed by the Diameter maintenance and extensions (DIME) working group of the Internet Engineering Task Force (IETF). One mechanism is a piggy backing mechanism that uses existing Diameter messages to carry overload control information. This mechanism is specified in IETF Internet Draft draft-roach-dime-overload-ctrl-03, May 17, 2013 (now expired), the disclosure of which is incorporated herein by reference in its entirety. Another Diameter overload control information carrying mechanism uses Diameter overload control application messages that are used only for communicating Diameter overload control information. This mechanism is specified in IETF Internet Draft draft-korhonen-dime-ovl-01.txt, Feb. 25, 2013 (now expired), the disclosure of which is incorporated herein by reference in its entirety. The current draft that specifies how to carry Diameter overload control information is draft-ietf-dime-ovli-02.txt, Mar. 27, 2014, the disclosure of which is incorporated herein by reference in its entirety.

Using existing Diameter overload control information carrying mechanisms, problems exist when nodes in the network do not support Diameter overload control, support Diameter overload control information but cannot be trusted to communicate overload control information to other nodes, or when it is desirable to aggregate individual node overload information into more of a whole-realm or whole-network view. For example, if a Diameter node desires to report Diameter overload control information to a non-adjacent Diameter node and one or more intervening nodes do not support Diameter overload control, such non-adjacent reporting may not be possible. The intervening nodes that do not support Diameter overload control create islands of Diameter overload control information reporting domains. Similarly, if the intervening node supports Diameter overload control but is untrusted, it may be desirable to hide the identity of the individual nodes reporting overload control information from the untrusted node.

Accordingly, in light of these difficulties, there exists a need for methods, systems, and computer readable media for collecting and distributing Diameter overload control information to non-adjacent nodes.

SUMMARY

Methods, systems, and computer readable media for collecting and distributing Diameter overload control information to non-adjacent nodes are disclosed. One system for implementing the subject matter described herein includes a Diameter overload control information broker. The Diameter overload control information broker includes a Diameter overload control information collector for receiving Diameter overload control information from Diameter nodes separate from the Diameter overload control information broker. The broker includes a memory for storing the Diameter overload control information. The broker further includes a Diameter overload control information distributor for distributing the Diameter overload control information to Diameter nodes.

As used herein, the term "node" refers to an addressable entity in a Diameter network. A node may be all or a portion of a physical computing platform, such as a server with one or more processor blades or a single processor blade that implements a Diameter function, such as a Diameter signaling router (DSR), a home subscriber server (HSS), a mobility management entity (MME), a policy and charging rules function (PCRF), an application function (AF), a subscription profile repository (SPR), etc. A node may include one or more processors and memory that execute and store the instructions for implementing the node's particular Diameter function. A node may also be a virtual entity implemented by one or more processor blades.

As used herein, the term "Diameter overload control information" refers to information that indicates that a Diameter node or group of nodes is in an overloaded state or has transitioned from an overloaded state to a non-overloaded state.

The subject matter described herein for collecting and distributing Diameter overload control information may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
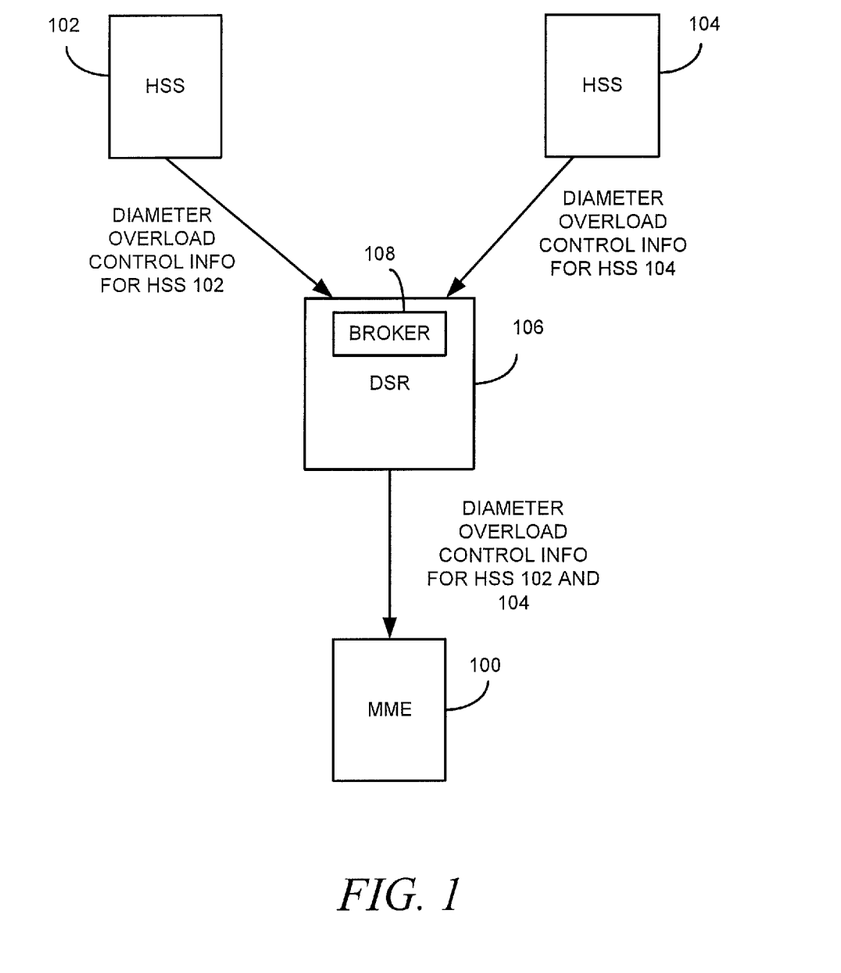
FIG. 1 is a network diagram illustrating a first use case for a Diameter overload control information broker according to an embodiment of the subject matter described herein.

Methods, systems, and computer readable media for collecting and distributing Diameter overload control information are disclosed. According to one aspect, the subject matter described herein includes a Diameter overload control information broker that collects Diameter overload control information from nodes separate from the Diameter overload control information broker and distributes that information to other Diameter nodes that are also separate from the Diameter overload control information broker. FIG. 1 is a network diagram illustrating a first use case for a Diameter overload control information broker according to an embodiment of the subject matter described herein. Referring to FIG. 1, the network includes a mobility management entity (MME) 100, two home subscriber servers (HSSs) 102 and 104, and a Diameter signaling router (DSR) 106. In this example, it is assumed that HSSs 102 and 104 support Diameter overload control, meaning that they support one or more of the mechanisms described above for communicating Diameter overload control information to other nodes. It is also assumed that MME 100 supports Diameter overload control information, meaning that MME 100 is capable of acting on Diameter overload control information received from other nodes. In this example, it is assumed that DSR 106 supports Diameter overload control. In order to support the communication of Diameter overload control information among non-adjacent nodes (such as HSS 102 and MME 100), a Diameter overload control information broker 108 may be provided. To mitigate the problem of a node maliciously reporting an incorrect overload scope, it is assumed that Diameter overload information broker 108 is trusted by the nodes to which broker 108 distributes Diameter overload control information. To facilitate the communication of overload control information among non-adjacent nodes, broker 108 functions as a hub to distribute Diameter overload control information on behalf of nodes that initially report the Diameter overload control information to nodes that are not adjacent to the reporting nodes.

In the illustrated example, Diameter overload control information broker 108 is a component of DSR 106. However, Diameter overload control information broker 108 may alternatively be a stand-alone entity or a component of another Diameter node, such as an HSS. Diameter overload control information broker 108 receives Diameter overload control information from other nodes, such as HSSs 102 and 104, and distributes that information to Diameter nodes, such as MME 100. The exemplary mechanisms by which Diameter overload control information broker 108 collects Diameter overload control information will be described in detail below with respect to FIG. 4.

Diameter overload control information broker 108 may distribute Diameter overload control information using any suitable mechanism, such as a query response interface or a pub-sub interface. For example, MME 100 may subscribe to receive Diameter overload control information regarding HSS 102 or HSS 104. When HSS 102 or HSS 104 reports overload control information to broker 108, broker 108 may check its subscriptions and determine that MME 100 is subscribed to receive the Diameter overload control information regarding HSSs 102 and 104 and may provide the information in response to receiving an update from HSS 102 or HSS 104.

In an alternate implementation, Diameter overload control information broker 108 may receive Diameter overload control information from HSS 102 or HSS 104. MME 100 may query Diameter overload control information broker 108 for Diameter overload control information regarding HSS 102 or HSS 104. In response to the query, Diameter overload control information broker 108 may respond with the requested Diameter overload control information.

Figure 2:
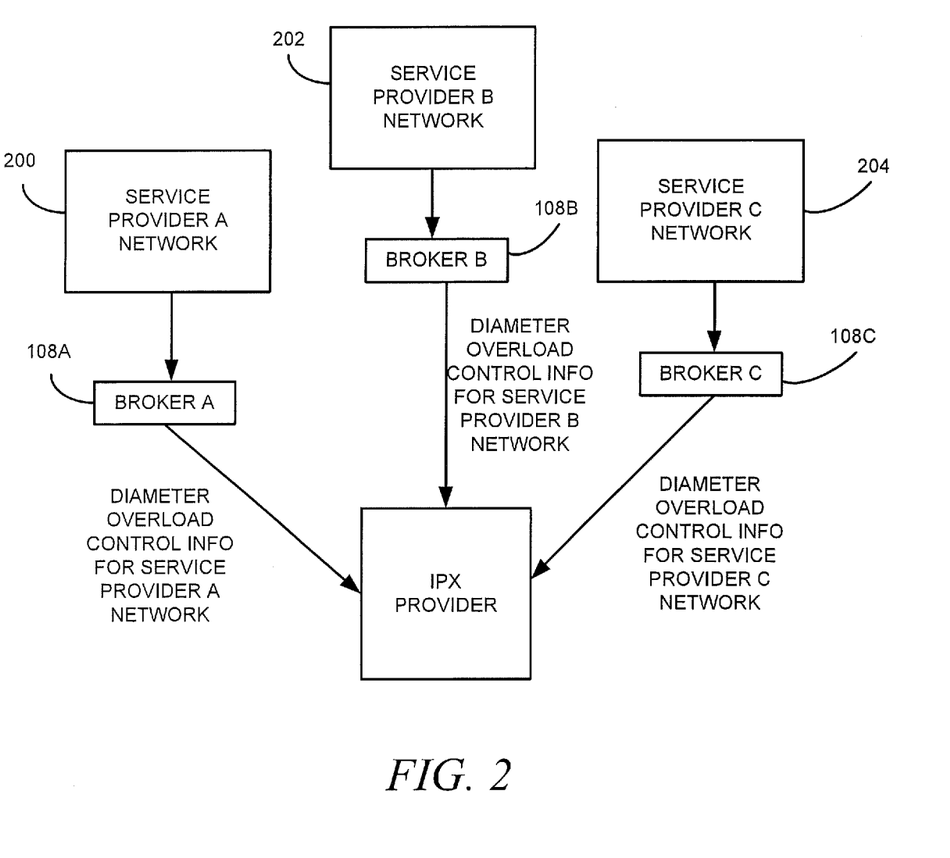
FIG. 2 is a network diagram illustrating a second use case for a Diameter overload control information broker according to an embodiment of the subject matter described herein.

FIG. 2 is a network diagram illustrating another use case for a Diameter overload control information broker according to an embodiment of the subject matter described herein. In FIG. 2, an IP exchange (IPX) vendor that connects a plurality of different carrier networks 200, 202, and 204. It would be desirable for networks 200, 202 and 204 to be able to exchange Diameter overload control information. However, the owners or operators of networks 200, 202, and 204 may not trust the IPX vendor to distribute their Diameter overload control information or to properly report the overload state of other operators. Accordingly, each network may include a Diameter overload control information broker 108A, 108B, or 108C that collects Diameter overload control information for nodes within the network and distributes that information outside of the network. For example, Diameter overload control information broker 108A may collect Diameter overload control information for a network A 200 and distribute that information outside of network A 200 in response to subscriptions or queries from other networks. Diameter overload control information brokers 108B and 108C may operate similarly for their respective networks.

Figure 3:
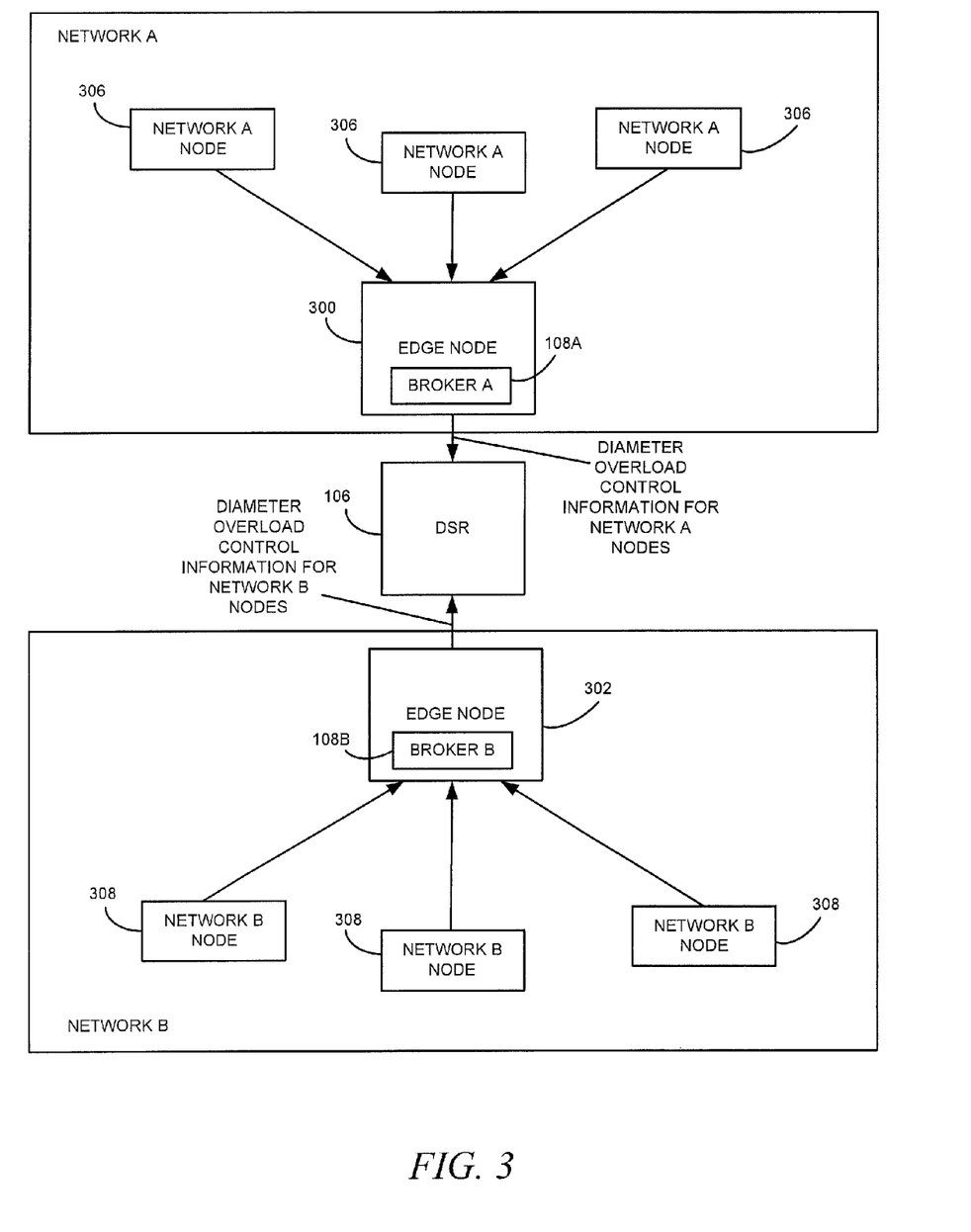
FIG. 3 is network diagram illustrating a third use case for a Diameter overload control information broker according to an embodiment of the subject matter described herein.

FIG. 3 is a network diagram illustrating in more detail the functionality of a Diameter overload control information broker that collects information within a network and reports that information outside of the network. In FIG. 3, edge agents 300 and 302 each include a Diameter overload control information broker 108A or 108B. Edge agents 300 and 302 each serve their respective networks and collect Diameter overload control information from nodes 306 and 308 within their respective networks. Within each network, Diameter overload control information may be communicated on a hop-by-hop basis, meaning that each node collects overload control information from its adjacent node and reacts to overload control information from its adjacent node. However, outside of the network, nodes may subscribe to receive overload control information from Diameter overload control information brokers. For example, node 306 may subscribe to Diameter overload control information broker 108B to obtain Diameter overload control information regarding one of nodes 308.

Figure 4:
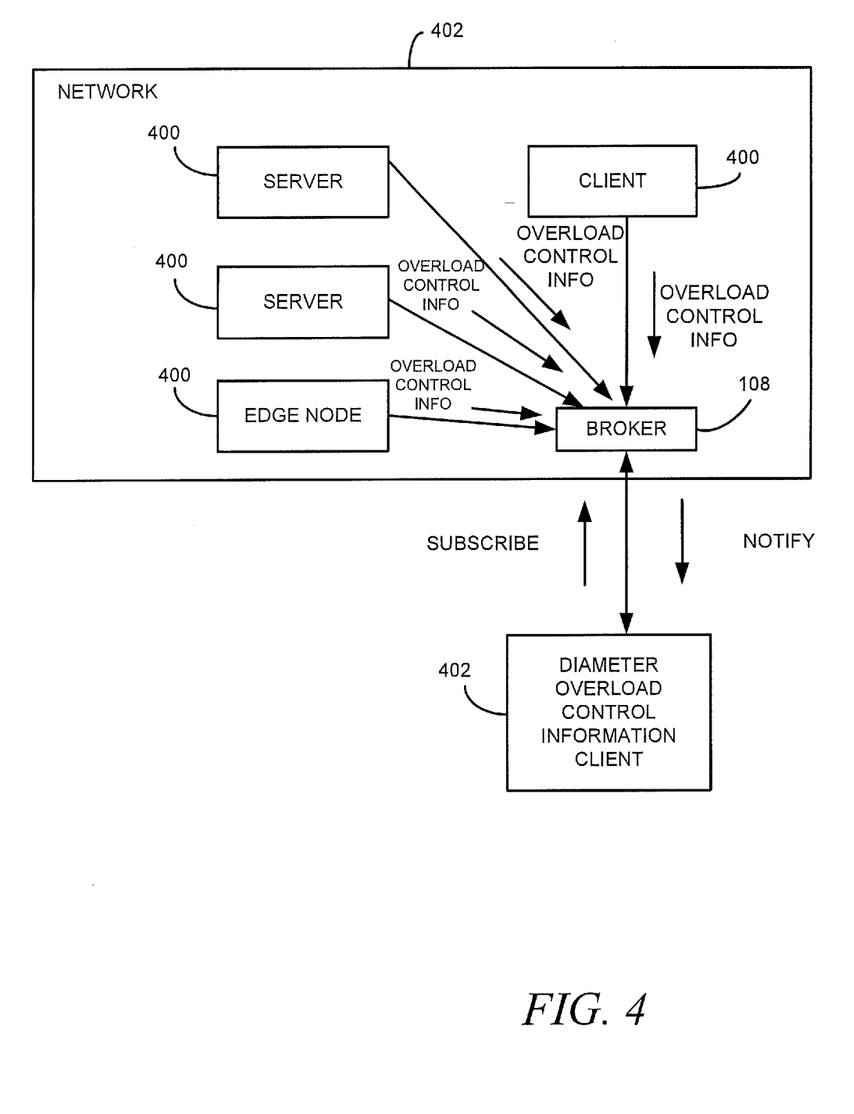
FIG. 4 is a diagram illustrating an exemplary mechanism for communication Diameter overload control information to a Diameter overload control information broker according to an embodiment of the subject matter described herein.

The mechanism by which a Diameter overload control information broker collects Diameter overload control information may be implemented in a number of ways. FIG. 4 illustrates one exemplary implementation by which a Diameter overload control information broker collects Diameter overload control information according to an embodiment of the subject matter described herein. Referring to FIG. 4, nodes 400 within network 402 publish Diameter overload control information to broker 108. In such a case, nodes 400 may be provisioned with the address of broker 108. Alternatively, broker 108 may subscribe to each node 400 to receive overload control information for each node. In yet another alternative implementation, broker 108 may periodically query each node for Diameter overload control information.

Outside of network 402, clients 404 subscribe to broker 108 to receive Diameter overload control information regarding nodes within network 402. In an alternate implementation, nodes outside of network 402 may query broker 108 for updated overload control information.

Figure 5:
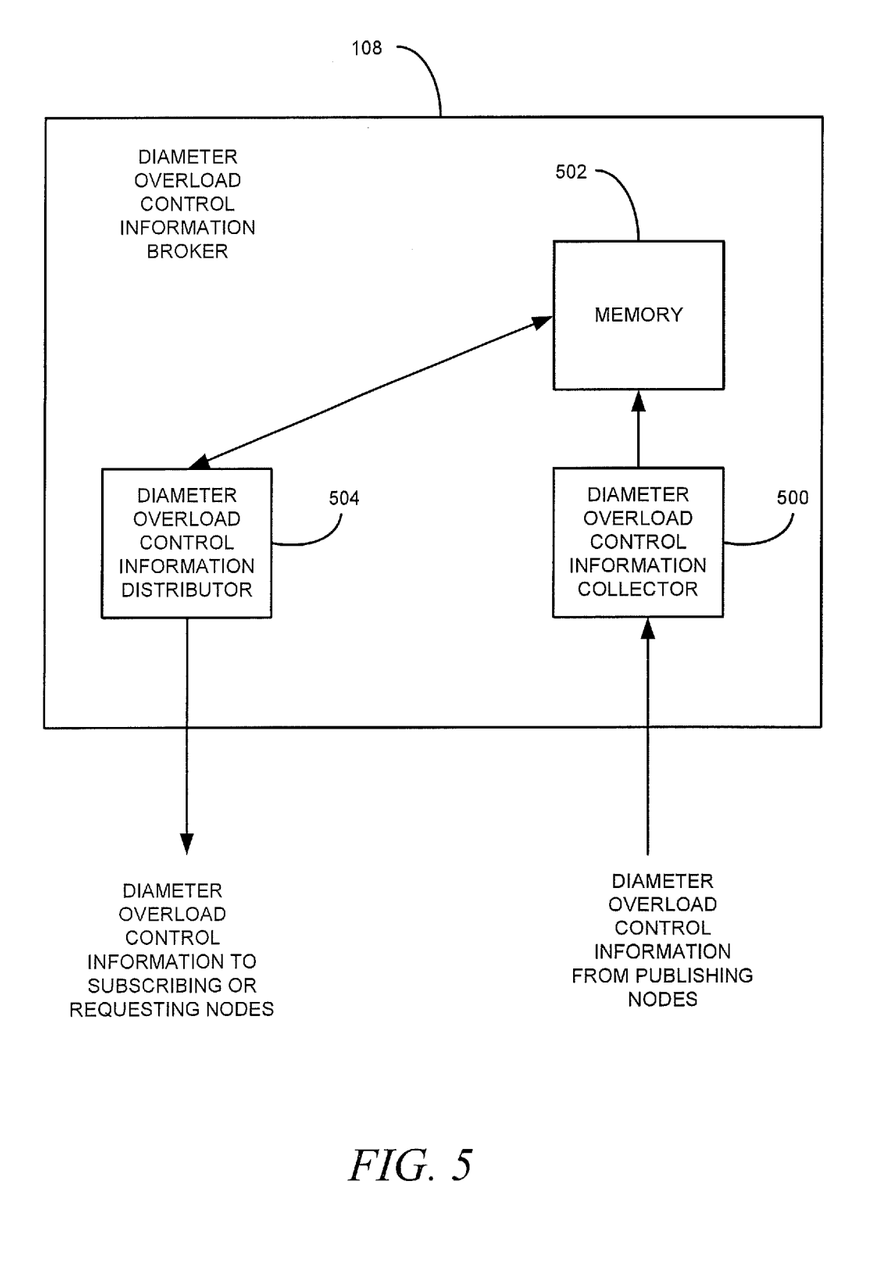
FIG. 5 is a block diagram illustrating an exemplary architecture for a Diameter overload control information broker according to an embodiment of the subject matter described herein.

FIG. 5 is a block diagram illustrating a Diameter overload control information broker according to an embodiment of the subject matter described herein. Referring to FIG. 5, Diameter overload control information broker 108 includes a Diameter overload control information collector 500 for collecting Diameter overload control information from other nodes. As stated above, the Diameter overload control information may be published to broker 108 or broker 108 may query other nodes to obtain overload control information. Broker 108 includes a memory 502 for storing the Diameter overload control information. Broker 108 further includes a Diameter overload control information distributor 504 for distributing Diameter overload control information to other nodes. In one implementation, distributor 504 may respond to queries for Diameter overload control information. In an alternate implementation, distributor 504 may receive subscriptions for Diameter overload control information and may provide updates of Diameter overload control information to subscribing nodes. The mechanism by which nodes obtain Diameter overload control information from broker 108 may utilize Diameter messages, SIP messages, web messages, or any other suitable protocol for carrying such information.

By collecting Diameter overload control information from a plurality of nodes, and providing a single point of access for such information, Diameter overload control information broker 108 serves as an aggregator of Diameter overload control information. By providing a Diameter overload control information aggregation service, the burden on overloaded nodes is reduced over implementations where overloaded nodes must keep track of multiple entities or peers to which overload control information is communicated. In addition, reporting "whole realm" overload scope protects the identities of individual nodes from untrusted nodes that may receive the overload control information.

Figure 6:
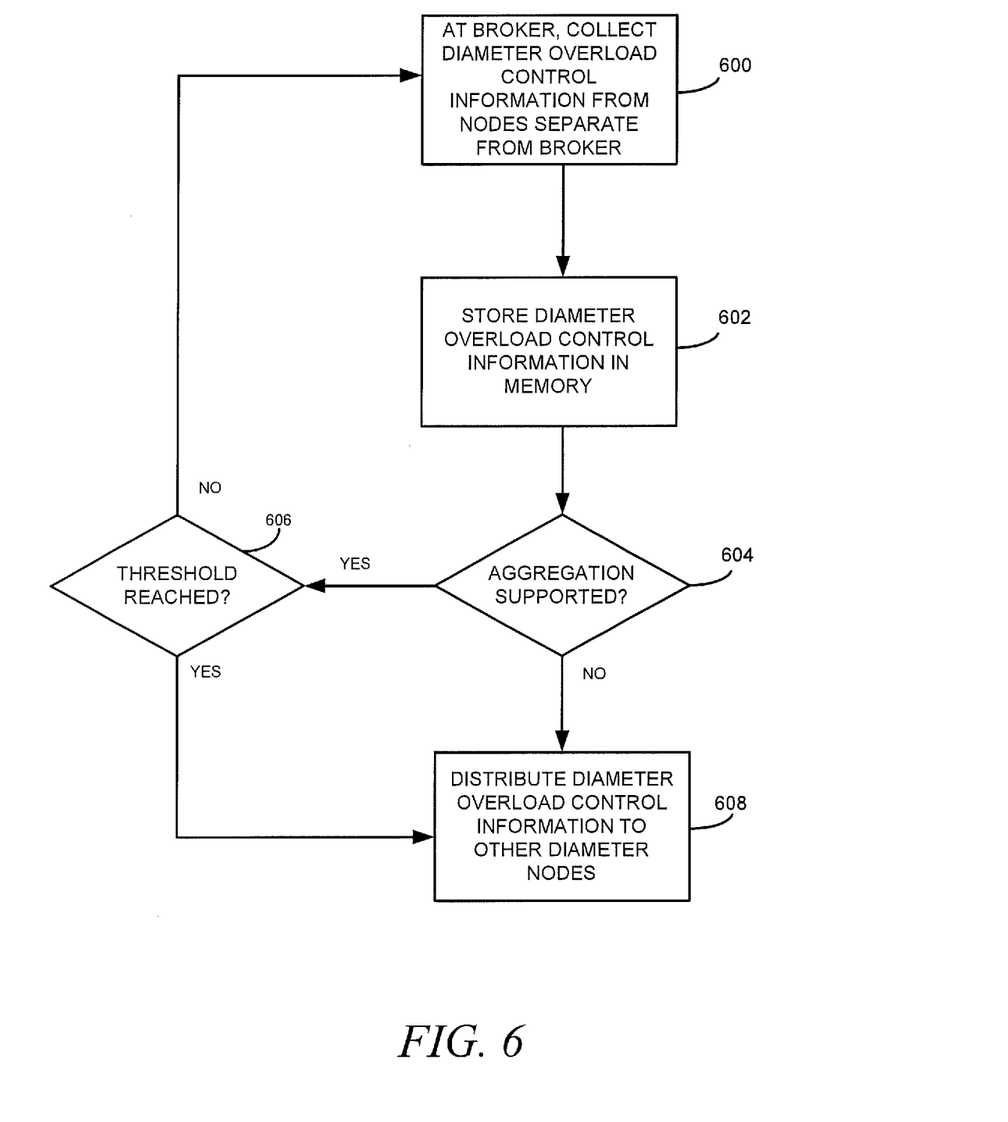
FIG. 6 is a flow chart illustrating an exemplary process for collecting and distributing Diameter overload control information according to an embodiment of the subject matter described herein.

FIG. 6 is a flow chart illustrating an exemplary process for collecting and distributing Diameter overload control information according to an embodiment of the subject matter described herein. Referring to FIG. 6, in step 600, Diameter overload control information is collected by Diameter overload control information broker 108. For example, broker 108 may receive Diameter overload control information from network nodes in response to subscriptions by Diameter overload control information broker 108, or in response to queries from Diameter overload control information broker 108, or by provisioning nodes in a network to distribute Diameter overload control information to broker 108. In step 602, Diameter overload control information broker 108 stores the Diameter overload control information in its memory. In step 604, if overload control information aggregation is supported, control proceeds to step 606 where broker 108 determines whether an aggregation threshold is reached. For example, if a predetermined percentage of nodes in a network have reported that they are overloaded, broker 108 may determine that the aggregation threshold has been reached proceed to step 608 to distribute the overload control information, which in the aggregated case would be for the network or realm, rather than the individual nodes. If the threshold has not been reached, control returns to step 600 where broker 108 continues to receive and store overload control information.

In step 604, if aggregation is not supported, control proceeds to step 608 where Diameter overload control information broker 108 distributes the Diameter overload control information to at least one Diameter node that is not adjacent to the Diameter node from which the overload control information was received. For example, broker 108 may distribute the Diameter overload control information to other Diameter nodes. The other Diameter nodes may be trusted nodes or untrusted nodes that are not directly connected to the nodes that reported the overload control information.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for collecting and distributing Diameter overload control information to non-adjacent nodes, the system comprising:
   a Diameter overload control information broker including:
      a Diameter overload control information collector for receiving Diameter overload control information from at least one first Diameter node separate from the Diameter overload broker, wherein the Diameter overload control information includes information that indicates that the at least one first Diameter node is in an overloaded state;
      a memory for storing the collected Diameter overload control information; and
      a Diameter overload control information distributor for distributing the Diameter overload control information to at least one second Diameter node that is not adjacent to the at least one first Diameter node from which the Diameter overload control information was received, wherein the Diameter overload control information distributor is configured to receive subscription requests for subscribing to receive Diameter overload control information from interested Diameter nodes and to maintain a database of Diameter overload control subscription information, wherein distributing the Diameter overload control information to the at least one second Diameter node includes:
         receiving the Diameter overload control information,
         accessing the database and determining that the at least one second Diameter node is subscribed to receive the Diameter overload control information,
         providing the at least one second Diameter node with the Diameter overload control information, and in response to receiving updates in the Diameter overload control information from the at least one first Diameter node, providing updated Diameter overload control information to the at least one second Diameter node.

2. The system of claim 1 wherein the Diameter overload control information collector is configured to receive Diameter overload control information carried in Diameter messages used for purposes other than Diameter overload control, to extract the Diameter overload control information from such messages, and store the extracted Diameter overload control information in the memory.

3. The system of claim 1 wherein the Diameter overload control information collector is configured to receive Diameter overload control information carried in Diameter overload control application report messages originating from a Diameter overload control application, to extract the Diameter overload control information from the messages and to store the Diameter overload control information in the memory.

4. The system of claim 1 wherein the Diameter overload control information collector is configured to query the at least one first Diameter node to obtain the Diameter overload control information.

5. The system of claim 1 wherein the Diameter overload control information collector is configured to subscribe to the at least one first Diameter node to obtain the Diameter overload control information.

6. The system of claim 1 wherein the Diameter overload control information distributor is configured to receive queries for Diameter overload control information and to respond to the queries.

7. The system of claim 1 wherein the Diameter overload control information broker comprises a stand-alone Diameter node dedicated to distributing the Diameter overload control information or a component of a Diameter node that performs a Diameter function other than overload control.

8. The system of claim 1 wherein the Diameter overload control information broker aggregates Diameter overload control information on behalf of the Diameter nodes from which Diameter overload control information is received and reports aggregated overload control information.

9. The system of claim 8 wherein the aggregated Diameter overload control information does not individually identify the Diameter nodes from which Diameter overload control information was received.

10. A method for collecting and distributing Diameter overload control information to non-adjacent nodes, the method comprising:
at a Diameter overload control information broker implemented by at least one processor:
receiving Diameter overload control information from at least one first Diameter node separate from the Diameter overload control information broker, wherein the Diameter overload control information includes information that indicates that the at least one first Diameter node is in an overloaded state;
storing the collected Diameter overload control information; and
distributing the Diameter overload control information to at least one second Diameter node that is not adjacent to the at least one first Diameter node from which the Diameter overload control information was received, wherein the Diameter overload control information broker is configured to receive subscription requests for subscribing to receive Diameter overload control information from interested Diameter nodes and to maintain a database of Diameter overload control subscription information, wherein distributing the Diameter overload control information to the at least one second Diameter node includes:
receiving the Diameter overload control information,
accessing the database and determining that the at least one second Diameter node is subscribed to receive the Diameter overload control information,
providing the at least one second Diameter node with the Diameter overload control information, and
in response to receiving updates in the Diameter overload control information from the at least one first Diameter node, providing updated Diameter overload control information to the at least one second Diameter node.

11. The method of claim 10 wherein receiving Diameter overload control information comprises receiving Diameter overload control information carried in Diameter messages used for purposes other than Diameter overload control extracting the Diameter overload control information from such messages.

12. The method of claim 10 wherein receiving Diameter overload control information comprises receiving Diameter overload control information carried in Diameter overload control application report messages originating from a Diameter overload control application and extracting the Diameter overload control information from the messages.

13. The method of claim 10 wherein receiving the Diameter overload control information includes receiving the information in response to querying the at least one first Diameter node to obtain the Diameter overload control information.

14. The method of claim 10 wherein receiving the Diameter overload control information includes subscribing to the at least one first Diameter node to obtain the Diameter overload control information.

15. The method of claim 10 wherein distributing the Diameter overload control information comprises receiving queries for Diameter overload control information and responding to the queries.

16. The method of claim 10 wherein the Diameter overload control information broker comprises a stand-alone Diameter node or a component of a Diameter node that performs at least one Diameter function other than Diameter overload control.

17. The method of claim 10 wherein the Diameter overload control information broker aggregates Diameter overload control information on behalf of the Diameter nodes from which Diameter overload control information is received and reports aggregated Diameter overload control information.

18. A non-transitory computer readable medium having stored thereon computer executable instructions embodied in a computer readable medium and when executed by a processor of a computer performs steps comprising:
at a Diameter overload control information broker:
receiving Diameter overload control information from at least one first Diameter node separate from the Diameter overload control information broker, wherein the Diameter overload control information includes information that indicates that the at least one first Diameter node is in an overloaded state;
storing the collected Diameter overload control information; and distributing the Diameter overload control information to at least one second Diameter node that is not adjacent to the at least one first Diameter node from which the Diameter overload control information was received, wherein the Diameter overload control information broker is configured to receive subscription requests for subscribing to receive Diameter overload control information from interested Diameter nodes and to maintain a database of Diameter overload control subscription information, wherein distributing the Diameter overload control information to the at least one second Diameter node includes:

receiving the Diameter overload control information, accessing the database and determining that the at least one second Diameter node is subscribed to receive the Diameter overload control information, providing the at least one second Diameter node with the Diameter overload control information, and in response to receiving updates in the Diameter overload control information from the at least one first Diameter node, providing updated Diameter overload control information to the at least one second Diameter node.

* * * * *

UNITED STATES PATENT AND TRADEMARK OFFICE
CERTIFICATE OF CORRECTION

PATENT NO. : 9,450,872 B2  
APPLICATION NO. : 14/313610  
DATED : September 20, 2016  
INVENTOR(S) : Campbell et al.

Page 1 of 1

It is certified that error appears in the above-identified patent and that said Letters Patent is hereby corrected as shown below:

On the Title Page

Column 2, under Attorney, Agent, or Firm, Line 1, delete "Jeknins," and insert -- Jenkins, --, therefor.

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*